United States Patent
Kanai et al.

(10) Patent No.: US 12,283,686 B2
(45) Date of Patent: Apr. 22, 2025

(54) BATTERY ELECTRODE

(71) Applicant: KABUSHIKI KAISHA TOSHIBA, Tokyo (JP)

(72) Inventors: Yuta Kanai, Tokyo (JP); Yasunobu Yamashita, Tokyo (JP); Kazuomi Yoshima, Yokohama Kanagawa (JP); Keigo Hoshina, Yokohama Kanagawa (JP); Tetsuya Sasakawa, Yokohama Kanagawa (JP); Yasuhiro Harada, Isehara Kanagawa (JP); Norio Takami, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 28 days.

(21) Appl. No.: 17/462,370

(22) Filed: Aug. 31, 2021

(65) Prior Publication Data

US 2022/0302431 A1    Sep. 22, 2022

(30) Foreign Application Priority Data

Mar. 17, 2021    (JP) .................................. 2021-043266

(51) Int. Cl.
*H01M 4/13* (2010.01)
*H01M 4/02* (2006.01)
(Continued)

(52) U.S. Cl.
CPC ............. *H01M 4/13* (2013.01); *H01M 4/661* (2013.01); *H01M 10/0525* (2013.01);
(Continued)

(58) Field of Classification Search
CPC ............. H01M 4/0404; H01M 4/0409; H01M 4/0435; H01M 4/13; H01M 4/70;
(Continued)

(56) References Cited

U.S. PATENT DOCUMENTS

2003/0087152 A1*  5/2003  Shindo .............. H01M 4/0404
                                                252/182.1
2006/0234115 A1* 10/2006  Watanabe ......... H01M 10/0587
                                                429/94
(Continued)

FOREIGN PATENT DOCUMENTS

CN       111180666 A  *  5/2020  ........ H01M 10/0525
JP       2001-76711 A      3/2001
(Continued)

OTHER PUBLICATIONS

Machine Translation—PE2E Search—CN 111180666 A (Year: 2023).*
(Continued)

*Primary Examiner* — Mayla Gonzalez Ramos
*Assistant Examiner* — Bethany C Garcia
(74) *Attorney, Agent, or Firm* — Finnegan, Henderson, Farabow, Garrett & Dunner, LLP

(57) ABSTRACT

According to one embodiment, an electrode is provided. The electrode includes an active material-containing layer and a current collector. The active material-containing layer comprises a first edge having an arc shape and a second edge positioned opposite to the first edge. The current collector comprises an active material-supporting section supporting the active material-containing layer, and an active material-non-supporting section. The curving amount is represented by a maximum distance from the first edge to a reference line connecting two points on the first edge. The curving amount is in a range of −1 mm or more and less than 0 mm.

7 Claims, 6 Drawing Sheets

(51) Int. Cl.
*H01M 4/66* (2006.01)
*H01M 10/0525* (2010.01)
*H01M 10/0587* (2010.01)

(52) U.S. Cl.
CPC .. *H01M 10/0587* (2013.01); *H01M 2004/021* (2013.01); *H01M 2004/025* (2013.01)

(58) Field of Classification Search
CPC ............. H01M 4/661; H01M 10/0525; H01M 10/0587; H01M 2004/021; H01M 2004/025; H01M 50/466; H01M 50/463; H01M 10/058; Y02E 60/10; B21B 37/28; B21B 37/38; B21B 2263/04; Y02P 70/50
See application file for complete search history.

(56) References Cited

U.S. PATENT DOCUMENTS

| | | |
|---|---|---|
| 2013/0074711 A1 | 3/2013 | Uematsu et al. |
| 2016/0240325 A1* | 8/2016 | Tajima ................ H01M 50/533 |
| 2022/0093933 A1* | 3/2022 | Li ........................ H01M 4/626 |
| 2022/0302431 A1* | 9/2022 | Kanai ................ H01M 4/0404 |

FOREIGN PATENT DOCUMENTS

| | | | | |
|---|---|---|---|---|
| JP | 2001076711 A | * | 3/2001 | ............ Y02E 60/10 |
| JP | 2007-273390 A | | 10/2007 | |
| JP | 2008-226555 A | | 9/2008 | |
| JP | 2012-174434 A | | 9/2012 | |
| JP | 2013-73690 A | | 4/2013 | |

OTHER PUBLICATIONS

Machine Translation—Espacenet—JP 2001076711 A (Year: 2023).*
Japan Patent Office, Decision to Grant a Patent in JP App. No. 2021-043266, 3 pages, and machine translation, 2 pages (Oct. 1, 2024).

* cited by examiner

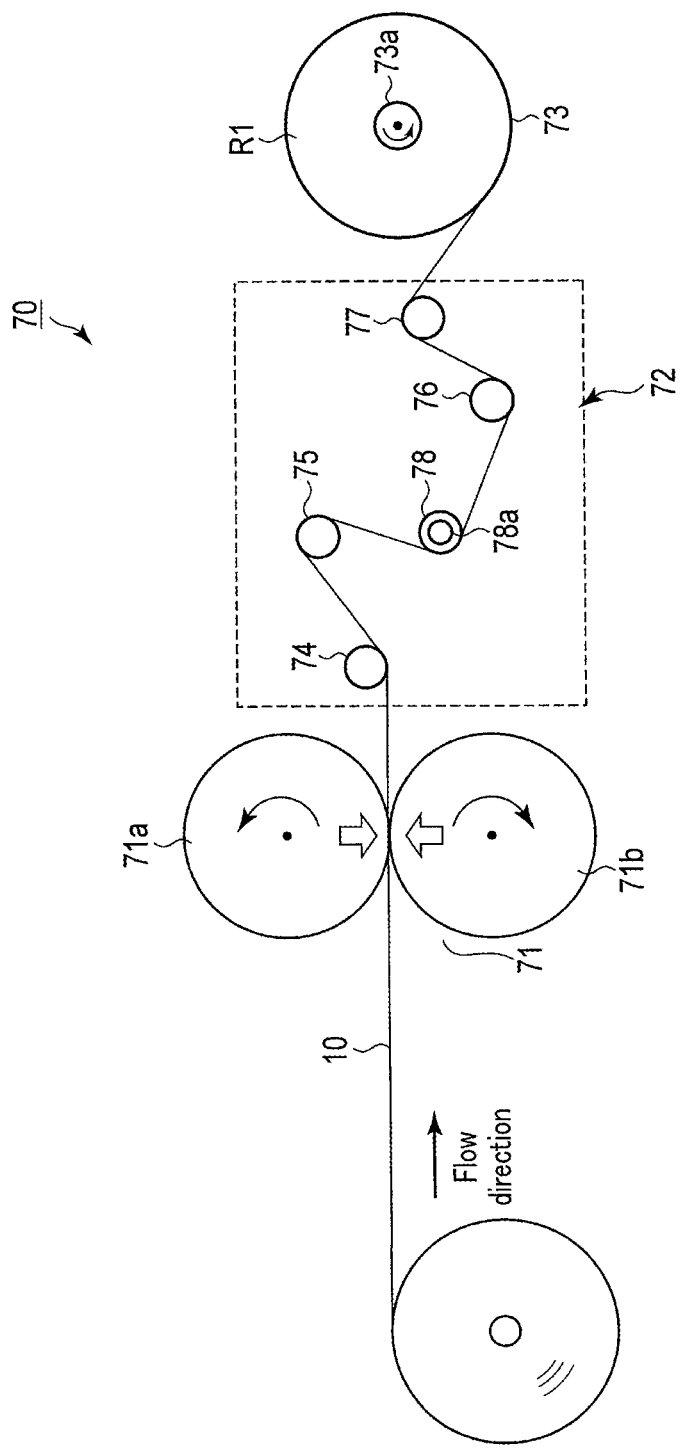
F I G. 5

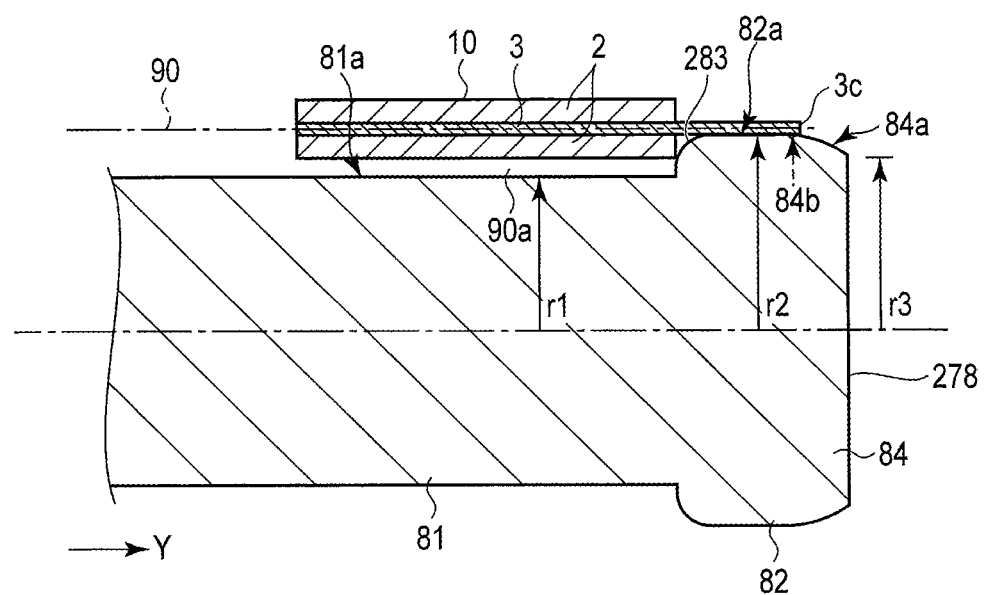
F I G. 10

BATTERY ELECTRODE

CROSS-REFERENCE TO RELATED APPLICATIONS

This application is based upon and claims the benefit of priority from Japanese Patent Application No. 2021-043266, filed Mar. 17, 2021, the entire contents of which are incorporated herein by reference.

FIELD

An embodiment described herein relate generally relates to an electrode.

BACKGROUND

In recent years, demand has been growing for secondary batteries having a high capacity, long cycle life, quick charge performance, and the like, as they are used as a power supply for vehicles such as hybrid electric vehicles as well as for conventional small electronic devices. Electrodes are compressed more densely so that as much of the active material as possible can be filled into a limited space of a battery.

To manufacture an electrode, electrode materials including active materials are applied onto a substrate formed of a band-shape current collector such as a metal foil, and are dried to form a materials layer, which is then compressed with a roll-press apparatus or the like. The applied region of the current collector that has been compressed extends due to plastic deformation; however, the unapplied region of the current collector, which is not coated with the electrode materials, does not extend because the pressure of press is not applied to the exposed portion of the current collector. Consequently, residual stress acts on a boundary between the applied region and the unapplied region due to the difference in extension between these regions of the current collector, resulting in occurrence of strain or warpage in the electrode. When producing an electrode group using electrodes, such as when producing an electrode group having a wound structure by winding a stack including a positive electrode and a negative electrode, problems such as winding misalignment of the electrodes occur due to the strain or warpage of the electrodes. An electrode group not having a wound structure, such as an electrode group having a stacked structure (a so-called stacked electrode group), is also faced with a problem of misalignment of the materials layers of the positive and negative electrodes facing each other. As such, the strain of the electrodes causes a decrease in production efficiency or a decrease in yield when producing an electrode group.

For example, a method in which a tension is applied to an unapplied portion of a pressed electrode to extend the electrode, so that the curving amount of the electrode is reduced, is known as a production method aimed at improving the yield for the production of an electrode group.

BRIEF DESCRIPTION OF THE DRAWINGS

FIG. 5 is an illustration diagram schematically showing a stretching apparatus used to produce the electrode according to the embodiment.

FIG. 10 is a cross-sectional view schematically showing a guide roller according to another modification.

DETAILED DESCRIPTION

Figure 1:
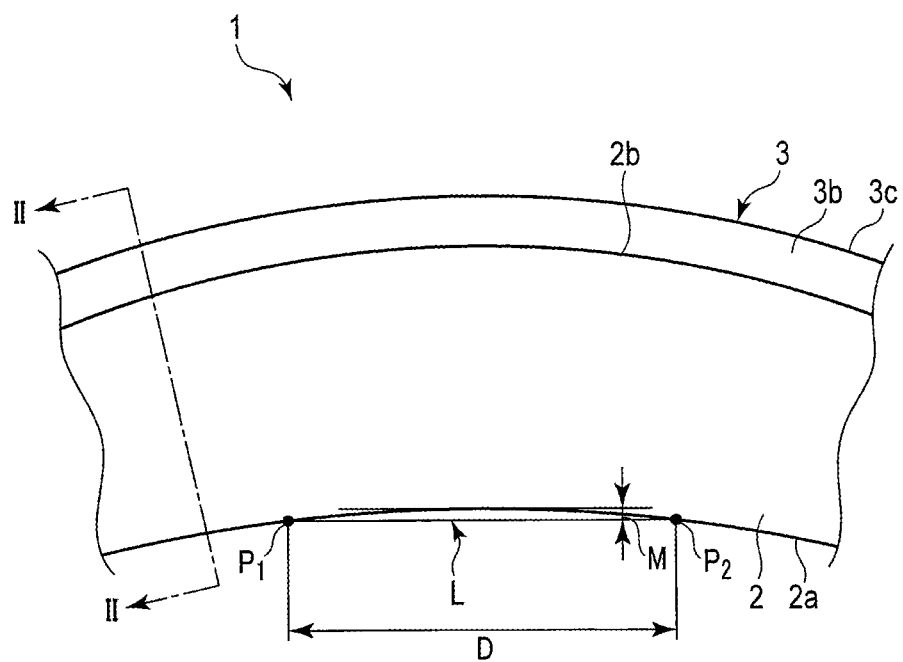
FIG. 1 is a plan view schematically showing an example of an electrode according to an embodiment.

According to an embodiment, an electrode is provided. The electrode includes an active material-containing layer and a current collector. The active material-containing layer has a first edge having an arc shape and a second edge positioned opposite to the first edge, and includes an electrode active material. The current collector includes an active material-supporting section supporting the active material-containing layer, and an active material-non-supporting section which is adjacent to the active material-supporting section and the second edge and is not provided with the active material-containing layer. The curving amount is represented by a maximum distance from the first edge to a reference line connecting two points on the first edge, and the two points are spaced apart from each other at a straight-line distance of 1000 mm. When the curving amount in a direction from the first edge toward the second edge is represented by a positive value, the curving amount is in a range of −1 mm or more and less than 0 mm.

As a result of conducting intensive research, the inventors have found that, when producing an electrode, even if straightening is performed to reduce a curve generated by a roll press, such as through application of tension, the curving amount increases again with the passage of time. Even if the degree of curve is suppressed to be small in the electrode immediately after the curve is corrected, the curving amount of the electrode may increase after a certain period of time to the extent that would cause problems such as winding misalignment in the production of the electrode group. Namely, even if the curving amount is sufficiently reduced by correcting the curved electrode, the curving amount increases with the passage of time, and consequently the yield in the production of an electrode group may decrease.

Hereinafter, embodiments will be described with reference to the drawings. The same reference signs are applied to common components throughout the embodiments and overlapping explanations are omitted. Each drawing is a schematic view for describing the embodiment and promoting understanding thereof; though there may be differences in shape, size and ratio from those in an actual device, such specifics can be appropriately changed in design taking the following explanations and known technology into consideration.

<Electrode Composition>

According to at least one embodiment and Example described above, an electrode is provided. The electrode includes an active material-containing layer and a current collector. The active material-containing layer has a first edge having an arc shape and a second edge positioned opposite to the first edge, and includes an electrode active material. The current collector includes an active material-supporting section supporting the active material-containing layer, and an active material-non-supporting section which is adjacent to the active material-supporting section and the second edge and is not provided with the active material-containing layer. The curving amount is represented by a maximum distance from the first edge to a reference line connecting two points on the first edge, and the two points are spaced apart from each other at a straight-line distance of 1000 mm. When the curving amount in a direction from the first edge toward the second edge is represented by a positive value, the curving amount is in a range of −1 mm or more and less than 0 mm.

When performing pressing in the production of an electrode, an active material-supporting section (applied region) of a current collector where an active material-containing layer (materials layer) is arranged extends due to plastic deformation, but an active material-non-supporting section (unapplied region) of the current collector does not extend. Thus, the electrode is deformed, making the side where the active material-non-supporting section is positioned be on the inner side of the curve. Namely, in the deformation due to pressing, the electrode warps toward the active material-non-supporting section. Herein, such a curve is regarded as a curve in a positive direction.

The electrode according to the embodiment is warped from the active material-non-supporting section side toward the opposite direction so that the side where the active material-non-supporting section of the current collector is positioned will be the outer side of the curve. Herein, such a curve is regarded as a curve in a negative direction. In other words, the electrode is curved in a direction opposite to the curve generated by the pressing. Since the curving amount of the electrode has a negative value, the curving amount after a temporal change is small even if the curving amount is increased. Thus, an electrode group having a high yield can be produced using the electrode.

Figure 2:
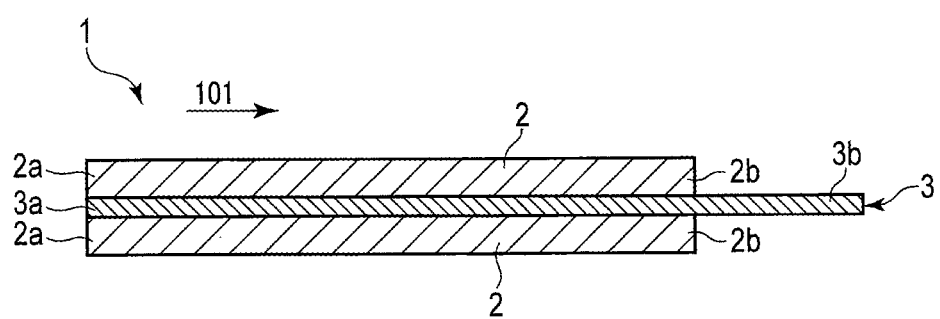
FIG. 2 is a schematic cross-sectional view taken along line II-II in FIG. 1.

The above electrode will be described with reference to the accompanying drawings. FIG. 1 is a plan view schematically showing an example of the electrode according to the embodiment. FIG. 2 is a schematic cross-sectional view taken along line II-II in FIG. 1.

An electrode 1 includes an active material-containing layer 2 and a current collector 3. The electrode 1 as a whole has a shape in which the band-shape current collector having a pair of long sides and the active material-containing layer on the current collector are curved within a plane parallel to the band shape.

The active material-containing layer 2 includes a first edge 2a having an arc shape along the inner rim edge of the curved electrode 1, and a second edge 2b positioned on a side of the active material-containing layer 2 opposite from the first edge 2a. The second edge 2b may correspond to the arc-shaped outer rim edge of the active material-containing layer 2.

The active material-containing layer 2 is supported on a principal surface of the band-shape current collector 3 forming an arc. In the example shown in the figure, the active material-containing layer 2 is provided on both the front and back principal surfaces of the current collector 3; however, the active material-containing layer 2 may be provided on only one of the principal surfaces of the current collector 3. Alternatively, the active material-containing layer 2 may be provided on both of the surfaces in a part of the current collector 3 in the long-side direction, and the active material-containing layer 2 may be provided on only one of the surfaces in another part of the current collector 3 in the long-side direction.

The current collector 3 includes an active material-supporting section 3a supporting the active material-containing layer 2, and an active material-non-supporting section 3b not provided with the active material-containing layer. When the current collector 3 is divided within a plane parallel to the principal surfaces of the current collector 3, a section corresponding to the region where the active material-containing layer 2 is provided on one or both of the front and back principal surfaces corresponds to the active material-supporting section 3a, and a section corresponding to the region where the active material-containing layer 2 is not provided in either of the principal surfaces corresponds to the active material-non-supporting section 3b. Namely, in an electrode configured so that the active material-containing layer 2 is provided on only one of the principal surfaces of the current collector 3, or in a part of an electrode, a region where the active material-containing layer 2 is not supported over the whole area of the other of the principal surfaces but is supported on the back side thereof, is regarded as the active material-supporting section 3a.

The active material-non-supporting section 3b of the current collector 3 is adjacent to the active material-supporting section 3a and the second edge 2b. The active material-non-supporting section 3b is located along the long side of the current collector 3 on the outer side of the arc. The active material-non-supporting section 3b can function as an electrode current collecting tab. The active material-non-supporting section 3b of the current collector 3 may also be referred to as a tab section. The active material-non-supporting section 3b may be simply referred to as a non-supporting section. An edge of the active material-non-supporting section 3b, that is, an edge on the outer rim edge side of the current collector 3 that is located on a side of the active material-non-supporting section 3b opposite from the active material-supporting section 3a, may be referred to as a third edge 3c for the sake of convenience. Also, the active material-supporting section 3a may be simply referred to as a supporting section.

In the electrode 1 illustrated in the figures, an edge (inner rim edge) of the active material-containing layer 2 and an edge (inner rim edge) of the current collector 3 are aligned on the first edge 2a side of the active material-containing layer 2; however, these edges may be misaligned to some extent. On the first edge 2a side as well, both of the principal surfaces of the current collector 3 may be in a state of not supporting the active material-containing layer. In such a case, the widths of the sections where the active material-containing layer is not supported on both of the front and back surfaces of the current collector 3 at the two edges across the principal surfaces of the current collector 3, in the first direction 101 along the length of the shortest distance connecting the edges on both sides, are compared, and the section having the larger width is determined as the active material-non-supporting section 3b capable of functioning as a current collecting tab. The edge of the active material-containing layer 2 adjacent thereto is determined as the second edge 2b. In this manner, a positional relationship among the first edge 2a, the second edge 2b, and the third edge 3c can be determined. These edges are arranged at any position along the longitudinal direction of the electrode 1 in the order of the first edge 2a, the second edge 2b, and the third edge 3c from a side of the electrode 1 opposite from the active material-non-supporting section 3b along the first direction 101.

The curving amount of the electrode 1 can be determined as follows. The first edge 2a and the second edge 2b of the active material-containing layer 2 are identified based on the arrangement of the active material-non-supporting section 3*b* of the current collector 3 and the active material-containing layer 2 (as well as the active material-supporting section 3*a* therebelow), as described above. A straight line connecting points $P_1$ and $P_2$ on the first edge 2*a* is defined as a reference line L. The points $P_1$ and $P_2$ are set so that the distance D of the straight line connecting these points is constant. For example, the straight-line distance D between the points $P_1$ and $P_2$ is set to 1000 mm. The curving amount is represented by a maximum distance M from the first edge 2*a* to the reference line L between the points $P_1$ and $P_2$. Herein, a direction from the first edge 2*a* toward the second edge 2*b* is set to a positive value. Namely, for the curving amount, a direction toward the active material-non-supporting section 3*b* of the current collector 3 along the short-side direction of the electrode 1 is set to a positive value. Also, with the position of the first edge 2*a* set to zero, a direction from said position toward the inner side of the electrode plane along the short-side width of the principal surface of the electrode may be referred to as a positive direction, and a direction from said position toward the outside of the electrode plane may be referred to as a negative direction.

In the above electrode, the curving amount when the straight-line distance D is set to 1000 mm has a negative value in the range of −1 mm or more and less than 0 mm. The curving amount may be in the range of −1 mm or more and −0.05 mm or less. Namely, the position of the reference line L connecting the points $P_1$ and $P_2$ is on the outer side of the first edge 2*a*. Thus, the electrode 1 is curved so that the first edge 2*a* will be the inner rim edge of the arc shape and the third edge 3*c* will be the outer rim edge of the arc shape.

The electrode according to the embodiment is curved in a direction opposite to the curve generated in conventional electrodes. The electrode according to the embodiment will be described through comparison with an example of a conventional electrode shown in FIG. 3.

Figure 3:
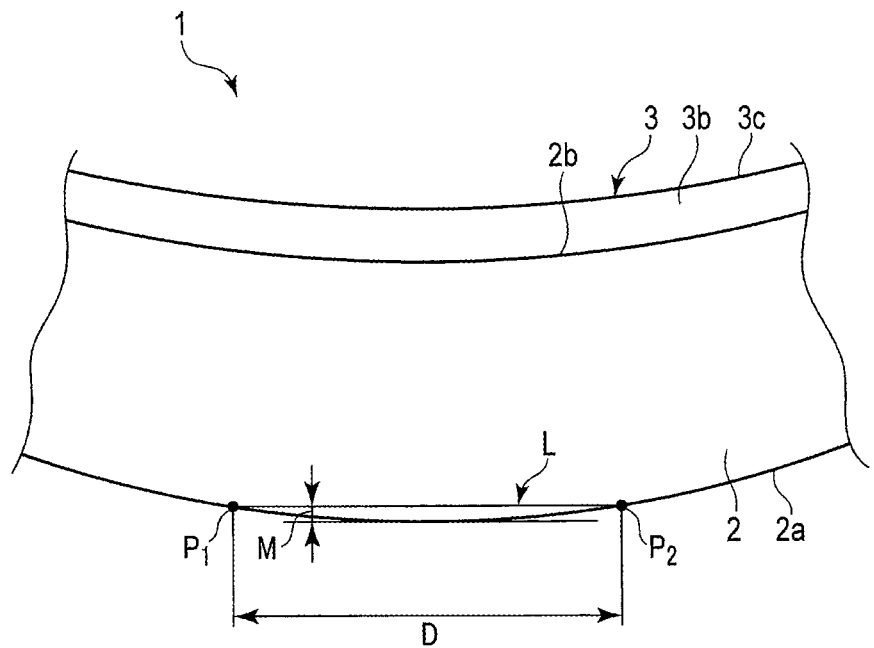
FIG. 3 is a plan view schematically showing an example of a conventional electrode.

FIG. 3 is a plan view schematically showing an example of a conventional electrode. An electrode 1 shown in FIG. 3 includes an active material-containing layer 2 and a current collector 3. The electrode 1 as a whole has a shape in which the band-shape current collector having a pair of long sides and the active material-containing layer on the current collector are curved within a plane parallel to the band shape. However, the electrode 1 shown in FIG. 3 is curved in a direction opposite to the case shown in FIG. 1.

For example, roll processing is performed on the active material-containing layer 2 in order to adjust the density of the active material-containing layer 2. In the roll processing performed by way of roll press using a general columnar roller having a constant diameter along the length thereof, the roller is not brought into contact with the active material-non-supporting section 3*b* of the current collector 3 not supporting the active material-containing layer 2. Therefore, the active material-non-supporting section 3*b* is not rolled, whereas the supporting section of the current collector 3 is rolled. The active material-non-supporting section 3*b* is hardly deformed, whereas the supporting section of the current collector 3 is widely extended by the roll processing. As a result, the electrode 1 is curved in an arc shape so that the third edge 3*c* side along which the active material-non-supporting section 3*b* is located will be the inner rim edge, and the first edge 2*a* side of the active material-containing layer 2 will be outer rim edge.

As shown in the figure, in the conventional electrode 1, the reference line L connecting the points $P_1$ and $P_2$ on the first edge 2*a* is positioned on the inner side of the first edge 2*a* of the electrode 1. Thus, the above-described curving amount takes a positive value. Whereas the conventional electrode (FIG. 3) is curved in the positive direction, the electrode according to the embodiment (FIG. 1) is curved in the negative direction.

Producing an electrode group using an electrode curved in a positive direction, as illustrated in FIG. 3, results in a decreased production efficiency or yield. The inventors have newly discovered that even if the curving amount is reduced to zero or nearly zero by straightening the electrode, the electrode may be curved again in the positive direction with the passage of time. Namely, as a result of a change over time of the electrode that has been straightened to resolve the strain or warpage, the electrode may return to the state of being curved in the positive direction, as shown in FIG. 3.

The electrode according to the embodiment is in the state of being curved in the negative direction in advance; thus, even if a change over time that causes the electrode to be curved in the positive direction progresses, the curving amount is suppressed to be small. Accordingly, producing an electrode group using said electrode can increase the yield.

The width of the active material-containing layer may be, for example, 60 mm to 250 mm. Herein, the width of the active material-containing layer corresponds to the distance between the first edge and the second edge. The width of the active material-containing layer corresponds to the width of the active material-supporting section of the current collector.

The width of the active material-non-supporting section in the current collector may be, for example, 5 mm to 25 mm. Herein, the width of the active material-non-supporting section is a width in a direction intersecting with the second edge of the active material-containing layer.

The mass per unit area of the active material-containing layer provided on the active material-supporting section of the current collector may be, for example, 100 g/m² to 300 g/m² for each surface of the current collector.

The above electrode may be an electrode for batteries. The electrode as an electrode for batteries may be, for example, a positive electrode or a negative electrode for secondary batteries. Herein, the secondary batteries include, for example, lithium ion secondary batteries and nonaqueous electrolyte batteries.

The active material-containing layer may have a density of, for example, 1.8 g/cm³ to 3.7 g/cm³. In the case of a positive electrode, the active material-containing layer (positive electrode active material-containing layer) may have a density of 2.7 g/cm³ to 3.7 g/cm³. In the case of a negative electrode, the active material-containing layer (negative electrode active material-containing layer) may have a density of 1.8 g/cm³ to 2.9 g/cm³. This density is a density of only the active material-containing layer excluding the current collector.

The electrode active material contained in the active material-containing layer includes a positive electrode active material or a negative electrode active material. In a typical case, the active material-containing layer of the electrode as a positive electrode (positive electrode active material-containing layer) includes a positive electrode active material as the electrode active material, and the active material-containing layer of the electrode as a negative electrode (negative electrode active material-containing layer) includes a negative electrode active material as the electrode active material.

The positive electrode may include, as the positive electrode active material, one kind of compound alone or two or more kinds of compounds in combination. Likewise, the negative electrode may include, as the negative electrode active material, one kind of compound alone or two or more kinds of compounds in combination.

As the positive electrode active material, for example, an oxide or a sulfide may be used. Examples of the oxide and sulfide include compounds capable of having Li and Li ions be inserted and extracted.

Examples of such compounds include manganese dioxide ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y\leq1$, $Li_xCoPO_4$; $0<x\leq1$), iron sulfates ($Fe_2(SO_4)_3$), vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xKiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these compounds as positive electrode active material.

When an ambient temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with ambient temperature molten salts, cycle life can be improved.

The ambient temperature molten salt (ionic melt) indicates compounds among organic salts made of combinations of organic cations and anions, which are able to exist in a liquid state at ambient temperature (15° C. to 25° C.). The ambient temperature molten salt includes an ambient temperature molten salt which exists alone as a liquid, an ambient temperature molten salt which becomes a liquid upon mixing with an electrolyte salt, an ambient temperature molten salt which becomes a liquid when dissolved in an organic solvent, and mixtures thereof. In general, the melting point of the ambient temperature molten salt used in secondary batteries is 25° C. or below. The organic cations generally have a quaternary ammonium framework.

Examples of the negative electrode active material include lithium titanate having a ramsdellite structure (e.g., $Li_{2+x}Ti_3O_7$, $0\leq x\leq3$), lithium titanate having a spinel structure (e.g., $Li_{4+x}Ti_5O_{12}$, $0\leq x\leq3$), monoclinic titanium dioxide ($TiO_2$), anatase titanium dioxide, rutile titanium dioxide, a hollandite titanium composite oxide, an orthorhombic titanium composite oxide, and monoclinic niobium-titanium composite oxide.

Examples of the orthorhombic titanium-containing composite oxide include a compound represented by $Li_{2+a}M1_{2-b}Ti_{6-c}M2_dO_{14+\sigma}$. Here, M1 is at least one selected from the group consisting of Sr, Ba, Ca, Mg, Na, Cs, Rb and K. M2 is at least one selected from the group consisting of Zr, Sn, V, Nb, Ta, Mo, W, Y, Fe, Co, Cr, Mn, Ni and Al. The respective subscripts in the composition formula are specified as follows: $0\leq a\leq6$, $0\leq b<2$, $0\leq c<6$, $0\leq d<6$, and $-0.5\leq\sigma\leq0.5$. Specific examples of the orthorhombic titanium-containing composite oxide include $Li_{2+a}Na_2Ti_6O_{14}$ ($0\leq a\leq6$).

Examples of the monoclinic niobium-titanium composite oxide include a compound represented by $Li_xTi_{1-y}M3_yNb_{2-z}M4_zO_{7+\delta}$. Here, M3 is at least one selected from the group consisting of Zr, Si, and Sn. M4 is at least one selected from the group consisting of V, Ta, and Bi. The respective subscripts in the composition formula are specified as follows: $0\leq x\leq5$, $0\leq y<1$, $0\leq z<2$, and $-0.3\leq\delta\leq0.3$. Specific examples of the monoclinic niobium-titanium composite oxide include $Li_xNb_2TiO_7$ ($0\leq x\leq5$).

Another example of the monoclinic niobium-titanium composite oxide is a compound represented by $Li_xTi_{1-y}M5_{y+z}Nb_{2-z}O_{7-\delta}$. Here, M5 is at least one selected from the group consisting of Mg, Fe, Ni, Co, W, Ta, and Mo. The respective subscripts in the composition formula are specified as follows: $0\leq x<5$, $0\leq y<1$, $0\leq z<2$, and $-0.3\leq\delta\leq0.3$.

The active material-containing layer may optionally contain an electro-conductive agent and a binder, in addition to the electrode active material.

The electro-conductive agent is added to improve current collection performance and to suppress the contact resistance between the electrode active material and the current collector. Examples of electro-conductive agent include carbonaceous substances such as vapor grown carbon fiber (VGCF), carbon black such as acetylene black, graphite, carbon nanotubes, and carbon nanofibers. One of these may be used as the electro-conductive agent, or alternatively, two or more may be used in combination as the electro-conductive agent. The electro-conductive agent may be omitted. Alternatively, a carbon coating or electron conducting inorganic material coating may be applied to the surface of the active material particle, instead of using an electro-conductive agent. In addition, the current collecting performance of the active material-containing layer may be improved by simultaneously using an electro-conductive agent and coating the active material surface with carbon or an electro-conductive material.

The binder is added to fill gaps among the dispersed active material and also to bind the electrode active material with the current collector. Examples of the binder include polytetrafluoroethylene (PTFE), polyvinylidene fluoride (PVdF), fluorine rubber, styrene-butadiene rubber, polyacrylic acid compounds, imide compounds, carboxymethyl cellulose (CMC), ad salts of CMC. One of these may be used as the binder, or two or more may be used in combination as the binder.

The blending proportions of the electrode active material, electro-conductive agent, and binder in the active material-containing layer may be appropriately changed according to the use of the electrode.

For example, when the electrode is used as a positive electrode of a secondary battery, the active material (positive electrode active material) and binder are preferably blended in proportions of 80% by mass to 99% by mass, and 1% by mass to 20% by mass, respectively. When the amount of the binder is 1% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased. When an electro-conductive agent is added, the active material (positive electrode active material), binder, and electro-conductive agent are preferably blended in proportions of 77% by mass to 97% by mass, 1% by mass to 20% by mass, and 2% by mass to 15% by mass, respectively.

When the amount of the electro-conductive agent is 2% by mass or more, the above-described effects can be expressed. By setting the amount of the electro-conductive agent to 15% by mass or less, the proportion of electro-conductive agent that contacts the electrolyte can be made low. When this proportion is low, decomposition of electrolyte can be reduced during storage under high temperatures.

For example, when the electrode is used as a negative electrode of a secondary battery, the active material (negative electrode active material), electro-conductive agent and binder are preferably blended in proportions of 68% by mass to 97% by mass, 2% by mass to 30% by mass, and 1% by mass to 30% by mass, respectively. When the amount of electro-conductive agent is 2% by mass or more, the current collection performance of the active material-containing layer can be improved. When the amount of binder is 2% by mass or more, binding between the active material-containing layer and current collector becomes sufficient, and excellent cycling performances can be expected. On the other hand, an amount of each of the electro-conductive agent and binder is preferably 30% by mass or less, in view of increasing the capacity.

In the case of coating the surface of the active material with carbon or a conductive material, the amount of the coating material can be considered to be included in the amount of the electro-conductive agent. The amount of coating with carbon or a conductive material is preferably 0.5% by mass to 5% by mass. If the coating amount is in this range, the current collecting performance and the electrode density can be increased.

For the current collector, used is a material which is electrochemically stable at the potential at which lithium (Li) is inserted into and extracted from the electrode active material.

For an electrode used as a positive electrode, for example, the current collector (positive electrode current collector) is preferably an aluminum foil, or an aluminum alloy foil containing one or more selected from the group consisting of Mg, Ti, Zn, Ni, Cr, Mn, Fe, Cu, and Si. The thickness of the aluminum foil or aluminum alloy foil is preferably from 5 µm to 20 µm, and more preferably 15 µm or less. The purity of the aluminum foil is preferably 99% by mass or more. The amount of transition metal such as iron, copper, nickel, or chromium contained in the aluminum foil or aluminum alloy foil is preferably 1% by mass or less.

For an electrode used as a negative electrode, the current collector (negative electrode current collector) is preferably made of copper, nickel, stainless steel, aluminum, or an aluminum alloy including one or more selected from the group consisting of Mg, Ti, Zn, Mn, Fe, Cu, and Si. The thickness of the current collector is preferably from 5 µm to 20 µm. The current collector having such a thickness can maintain balance between the strength and weight reduction of the electrode.

In both the aspect as the positive electrode and the aspect as the negative electrode, the current collector desirably includes aluminum.

For example, an electrode according to the embodiment may constitute a wound electrode group when mounted in a battery. Namely, the electrode may be at least one electrode for a wound electrode group. Alternatively, the electrode may be included in a stacked electrode group, for example, and mounted in a battery. Namely, the electrode may be at least one electrode for a stacked electrode group.

The electrode according to the embodiment having an aspect as a positive electrode, and another electrode as a negative electrode may be used to constitute an electrode group. Alternatively, the electrode according to the embodiment having an aspect as a negative electrode, and another electrode as a positive electrode may be used to constitute an electrode group. Alternatively, the aspect of the electrode according to the embodiment as a positive electrode, and the aspect of the electrode according to the embodiment as a negative electrode may be adopted to constitute an electrode group.

In the case of adopting for an electrode group another electrode as a counter electrode to the electrode according to the embodiment, which is curved in the curving amount having a negative value described above, it is preferable that the curve of said another electrode be corrected. An electrode obtained immediately after its curve is corrected is more preferably employed. Namely, for the electrode group, it is preferable to combine the aspect of the electrode according to the embodiment as a positive electrode and the aspect of the electrode according to the embodiment as a negative electrode, or combine the electrode according to the embodiment with an electrode having almost no curve as a counter electrode.

In addition to the positive electrode and negative electrode, the electrode group may further include a separator disposed between the positive electrode and negative electrode. The separator may be made of, for example, a porous film or synthetic resin nonwoven fabric including polyethylene (PE), polypropylene (PP), cellulose, or polyvinylidene fluoride (PVdF).

Figure 4:
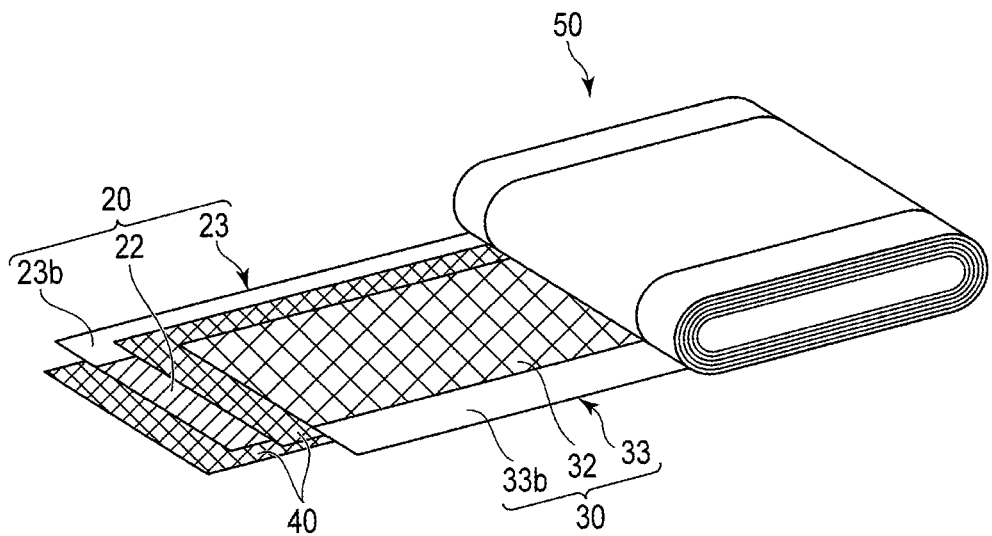
FIG. 4 is a schematic perspective view of an electrode group.

An example of the electrode group is shown in FIG. 4. An electrode group 50 shown in FIG. 4 is a flat wound electrode group. The flat wound electrode group 50 includes a positive electrode 20, a negative electrode 30, and a separator 40. The separator 40 is interposed between the positive electrode 20 and the negative electrode 30. At least one of the positive electrode 20 or the negative electrode 30 is the electrode according to the embodiment.

The positive electrode 20 includes a positive electrode current collector 23 and a positive electrode active material-containing layer 22 formed on a surface of the positive electrode current collector 23. The positive electrode current collector 23 includes a positive electrode current collecting tab 23b corresponding to a section where the positive electrode active material-containing layer 22 is not formed on the surface of the positive electrode current collector 23. The positive electrode current collecting tab 23b corresponds to an active material-non-supporting section of the positive electrode 20.

The negative electrode 30 includes a negative electrode current collector 33 and a negative electrode active material-containing layer 32 formed on a surface of the negative electrode current collector 33. The negative electrode current collector 33 includes a negative electrode current collecting tab 33b corresponding to a section where the negative electrode active material-containing layer 32 is not formed on the surface of the negative electrode current collector 33. The negative electrode current collecting tab 33b corresponds to an active material-non-supporting section of the negative electrode 30.

A stacked electrode group may include, for example, a plurality of positive electrodes each including a rectangular positive electrode active material-containing layer, and a plurality of negative electrodes each including a rectangular negative electrode active material-containing layer (example thereof not shown). For example, the electrode group may further include one or more separators. As a specific example, the stacked electrode group may have a structure in which the positive electrode, the separator, and the negative electrode are stacked in the order of "-positive electrode-separator-negative electrode-separator-positive electrode-separator-negative electrode-separator-". For example, a plurality of separators may be interposed between the positive and negative electrodes, or a single separator may be interposed between the positive and negative electrodes in a zigzag manner.

<Method for Producing Electrode>

The electrode described above can be produced, for example, as follows.

First, an electrode active material, a binder, and an optional electro-conductive agent are suspended in a solvent to prepare a slurry. The slurry is applied onto one or both of the principal surfaces of a current collector. Then, the applied slurry is dried to yield an electrode sheet formed of a stack of an active material-containing layer(s) and the current collector. The electrode sheet is subjected to pressing to adjust the density of the active material-containing layer, and then subjected to stretching.

Herein, the current collector may have, for example, a band shape. As an example, the current collector may have a rectangular shape. In the production of the electrode sheet, not applying the slurry to an edge of the current collector along the long side of the current collector on one side in the short-side direction, for example, can render the portion not coated with the slurry on the current collector a portion not supporting the active material-containing layer. Also, in advance of the pressing or stretching of the electrode sheet, the electrode sheet is preferably cut so that the active material-non-supporting section is arranged along only one of the long sides of the current collector.

The electrode sheet is produced by, for example, continuously and sequentially performing application of the slurry onto the current collector and drying of the slurry, and then rolled up like a hoop to yield a roll of electrode sheet. The electrode sheet can be wound out from the roll and subjected to continuously performed pressing and stretching. The electrode sheet can also be rolled up like a hoop after subjected to pressing. Even after the electrode sheet has been rolled up, the electrode sheet can be cut by, for example, slit processing.

An example of the press operation and the stretching operation will be described with reference to FIGS. 5 to 8. In these drawings, arrows X, Y and Z indicate three orthogonal directions. Also, the structural elements are enlarged, reduced in scale, or omitted, as necessary, for ease of illustration.

FIG. 5 schematically shows a stretching apparatus used to produce the above electrode. A stretching apparatus 70 shown in FIG. 5 includes the following units successively arranged downstream from the upstream side in the feed direction of the electrode sheet 10: a press unit 71 which compresses the electrode sheet 10 to increase the electrode density; a stretching unit 72 which stretches the electrode sheet 10 bent in the positive direction when compressed, to thereby bend the electrode sheet 10 in the negative direction; and a roll-up unit 73 which rolls up the pressed and stretched electrode sheet 10.

The press unit 71 includes a pair of press rollers 71*a* and 71*b*. As the press rollers 71*a* and 71*b* are rotated about an axis extending along the Y-axis by a drive unit, the electrode sheet 10 sandwiched between the press rollers 71*a* and 71*b* is compression-molded.

As a rotary shaft 73*a* is rotated about an axis extending along the Y-axis by the drive unit, the roll-up unit 73 rolls up the electrode sheet 10 like a hoop to thereby form a roll R1.

The stretching unit 72 includes a plurality of metallic guide rollers (driven rollers) 74 to 78 and guides the electrode sheet 10 from the press unit 71 to the roll-up unit 73. Longitudinal tension (roll-up tension) is applied to the electrode sheet 10 which is transported from the press rollers 71*a* and 71*b* to the roll-up unit 73. The guide rollers 74 to 77 are alternately arranged on the upper and lower surfaces of the electrode sheet 10, so that the tension applied to the electrode sheet 10 is within a desired range suitable for the roll-up operation. The guide roller 78 functions as a stretching member.

Figure 6:
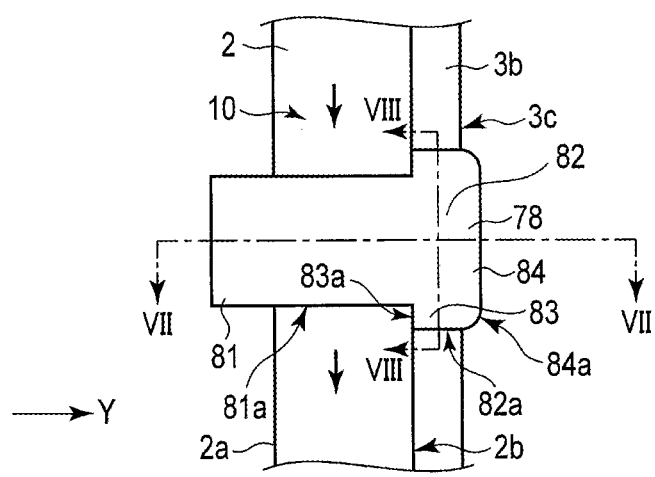
FIG. 6 is an illustration diagram showing a positional relationship between a guide roller of the stretching apparatus shown in FIG. 5 and the electrode.
Figure 7:
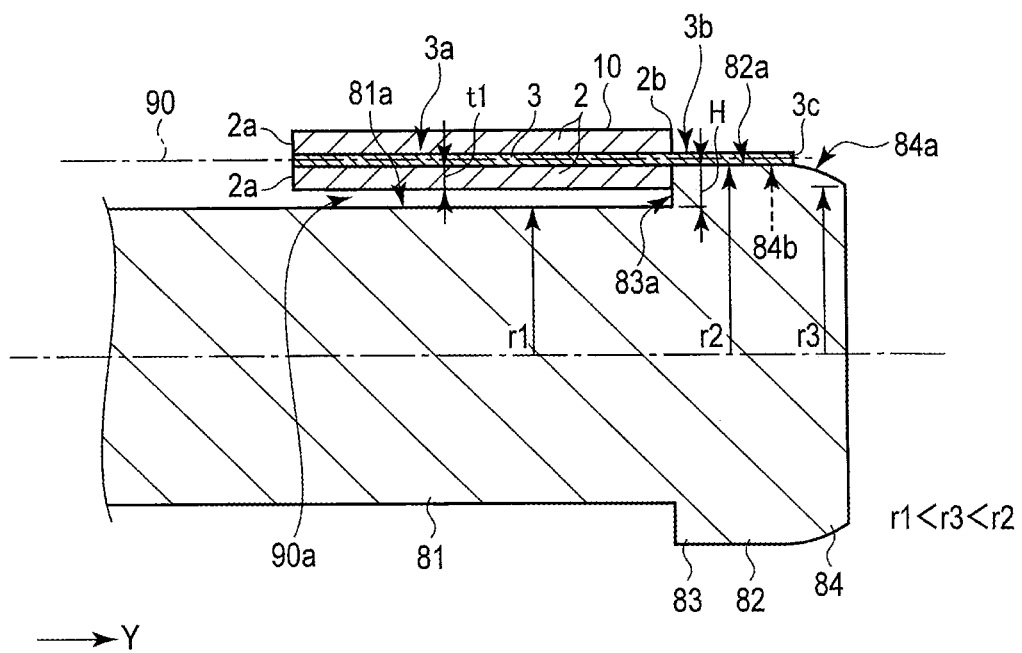
FIG. 7 is a schematic cross-sectional view taken along line VII-VII in FIG. 6.
Figure 8:
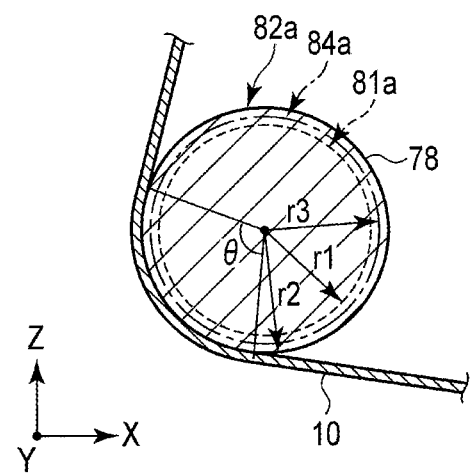
FIG. 8 is a schematic cross-sectional view taken along line VIII-VIII in FIG. 6.

As shown in FIGS. 6 to 8, the guide roller 78 includes a small-diameter portion 81 and a large-diameter portion 82 which are arranged along the axial direction. The small-diameter portion 81 and the large-diameter portion 82 have a columnar shape. The small-diameter portion 81 and the large-diameter portion 82 are connected to each other on the same axis of the respective columnar structures. The small-diameter portion 81 includes a retracted surface 81*a* corresponding to the side surface of the columnar structure. The large-diameter portion 82 includes a projecting surface 82*a* corresponding to the side surface of the columnar structure. As shown in the figures, the guide roller 78 may include a relief portion 84 disposed at a predetermined distance from a boundary between the small-diameter portion 81 and the large-diameter portion 82 toward the large-diameter portion 82 side. The relief portion 84 shown in the figures is formed continuous with the large-diameter portion 82 and rounded so that its diameter gradually decreases and its profile is curved. The relief portion 84 may be omitted.

The outer peripheral surface of the small-diameter portion 81 forms the retracted surface 81*a*, the outer peripheral surface of the large-diameter portion 82 forms the projecting surface 82*a*, and the outer peripheral surface of the relief portion 84 forms the relief surface 84*a*. Specifically, the retracted surface 81*a* facing the principal surface of the active material-containing layer 2 of the electrode sheet 10, the projecting surface 82*a* facing the active material-non-supporting section 3*b* of the current collector 3, and the relief surface 84*a* facing the edge region of the electrode sheet 10 along the third edge 3*c*, are formed continuously on the outer peripheral surface of the guide roller 78.

The radius r1 of the small-diameter portion 81, the radius r2 of the large-diameter portion 82, and the radius r3 of the relief portion 84 satisfy the relationship of r1<r3<r2. The radius r1 of the small-diameter portion 81 corresponds to the distance from the central axis of the columnar structure to the retracted surface 81*a*. The radius r2 of the large-diameter portion 82 corresponds to the distance from the central axis of the columnar structure to the projecting surface 82*a*. The large-diameter portion 82 projects in a radial direction relative to the small-diameter portion 81, and the projecting surface 82*a* is positioned outside the retracted surface 81*a*. The radius r3 of the relief portion 84 corresponds to the radius of the circular end surface of the relief portion 84.

The projecting surface 82*a* projects with respect to a conveying plane 90 indicated by a broken line in the figure, and the retracted surface 81*a* is spaced apart from the conveying plane 90. The relief surface 84a is curved like an arc such that it is gradually spaced apart from the conveying plane 90.

A positional relationship between the guide roller 78 and the electrode sheet 10 is such that the active material-containing layer 2 faces the small-diameter portion 81 and the large-diameter portion 82 does not ride on the principal surface of the active material-containing layer 2. Specifically, the arrangement of the electrode sheet 10 and the guide roller 78 in the axial direction (Y-direction) is such that the second edge 2b of the active material-containing layer 2 corresponding to the boundary between the active material-containing layer 2 and the active material-non-supporting section 3b comes into contact with a wall surface 83a of a step portion 83.

With the electrode sheet 10 wound around the guide roller 78, the retracted surface 81a, which is the outer peripheral surface of the small-diameter portion 81, is not in contact with either the current collector 3 or the active material-containing layer 2 of the electrode sheet 10, so that a gap 90a is formed between them. Specifically, a difference in level H which is determined by the difference r2−r1 between the radius r2 of the large-diameter portion 82 and the radius r1 of the small-diameter portion 81 is set to be larger than the thickness t1 of the active material-containing layer 2 and satisfy H>t1.

If the thickness t1 of the active material-containing layer is 100%, the difference in level H (%) is preferably in the range of 150%≤H≤600%.

By adjusting the difference in level H to 150% or more of the thickness t1, stress can be fully concentrated on the active material-non-supporting section 3b to stretch it. Further, by adjusting the difference in level H to 600% or less of the thickness t1, wrinkling and cracking near the boundary between the active material-non-supporting section 3b and the active material-containing layer 2 (i.e., near the second edge 2b) can be suppressed. To enhance the effect of preventing wrinkling and cracking, H is more preferably in the range of 200%≤H≤400%.

The relief surface 84a and a portion of the current collector 3 along the third edge 3c are arranged to face each other. Specifically, the third edge 3c of the current collector 3 is positioned outside a start end 84b of the relief surface 84a in the axial direction (Y-direction).

Also, a jamb angle θ at which the electrode sheet 10 is wound around the guide roller 78 is preferably 60° or more, as shown in FIG. 8.

Further, the guide roller 78 may include a heater 78a for use as a heating device. Stretching deformation of the electrode sheet 10 is facilitated by performing heat treatment using the heater in the stretching operation.

If the electrode sheet 10 wound around the guide roller 78 configured as described above is rolled up by the roll-up unit 73, the active material-non-supporting section 3b in contact with the contact surface is pulled and stretched in the longitudinal direction (feed direction) by the tension. When tension having a certain intensity is applied to the active material-non-supporting section 3b, the curve of the electrode sheet 10 generated by a difference in the stretching amount during pressing is corrected. By applying larger tension, the electrode sheet 10 can be curved in a direction opposite to the curve generated during pressing. Namely, by stretching the active material-non-supporting section 3b with larger tension than the tension used to correct the curve of the electrode sheet 10, the electrode 1 according to the embodiment in the curved state shown in FIG. 1 can be obtained from the state of the conventional curved electrode 1 shown in FIG. 3.

By setting the conditions such that the tension in the longitudinal direction (conveying direction) applied to the electrode sheet 10 before and after the guide roller 78 inside the stretch unit 72 is from 10 N to 100 N, the electrode according to the embodiment curved in a direction opposite to the curve generated by pressing can be obtained. The tension at the midpoint described above can be controlled by, for example, appropriately adjusting the positions of the guide rollers 74 to 78, the speed of winding out the electrode sheet 10, and the speed of rolling up the electrode sheet 10.

The press operation involves, for example, inserting the electrode sheet 10 wound into a roll between the rotating press rollers 71a and 71b while winding out the electrode sheet 10, and then compression-molding the electrode sheet 10. The direction in which the electrode sheet 10 is inserted is parallel to the longitudinal direction of the electrode sheet 10, and the pressure of press is applied mainly to the active material-containing layer 2, so that the active material-containing layer 2 is compression-molded to increase its density. At this time, the pressure of press is hardly applied to the active material-non-supporting section 3b; thus, the amount of stretching of the current collector 3 becomes smaller in the active material-non-supporting section 3b than in the active material-supporting section 3a. Consequently, strain or warpage is generated in the electrode sheet 10.

The electrode sheet 10 having passed between the press rollers 71a and 71b is sent downstream and conveyed to the roll-up unit 73 through the guide rollers 74 to 78. On this occasion, at the guide roller 78, which also functions as a stretching member, the active material-supporting section 3a and the active material-containing layer 2 correspond to the small-diameter portion 81, and the large-diameter portion 82 and the active material-non-supporting section 3b are arranged to face each other, as shown in FIGS. 6 to 8. Specifically, the active material-non-supporting section 3b of the current collector 3 comes into contact with the projecting surface 82a, which is the outer peripheral surface of the large-diameter portion 82, and the gap 90a is formed between the retracted surface 81a, which is the outer peripheral surface of the small-diameter portion 81, and the active material-containing layer 2.

In this state, the electrode sheet 10 is rolled up by the roll-up unit 73 as the stretching operation. In the stretching operation, tensile stress F in the cross-section parallel to the short-side direction (width direction) of the electrode sheet 10 is preferably in the range of 1 N/mm²≤F≤100 N/mm². By setting the tensile stress F to 1 N/mm² or more, the active material-non-supporting section 3b of the current collector 3 (the exposed portion of the current collector) can be stretched sufficiently, while satisfying the stress needed to roll up the electrode with high precision. By setting the tensile stress F to 100 N/mm² or less, the active material-non-supporting section 3b can be stretched sufficiently without breaking the electrode or decreasing the precision of rolling up the electrode. Therefore, by setting the tensile stress F in the range of 1 N/mm²≤F≤100 N/mm², the active material-non-supporting section 3b can be stretched sufficiently without breaking the electrode and while rolling up the electrode with high precision. In order to enhance the effects of preventing breakage of the electrode and a decrease in the precision of rolling up the electrode, the tensile stress F is more preferably in the range of 20 N/mm²≤F≤40 N/mm², depending on the difference in level or the shape of the corner portion.

For example, the stretching operation is preferably performed while performing a heat treatment at a temperature of 60° C. to 150° C. with the heater 78a. By setting a heat treatment temperature T to 60° C. or more, the effect of reducing the stress needed for plastic deformation can be enhanced. The higher the heat treatment temperature T, the greater the effect of reducing the stress can be; however, the heat treatment temperature T is preferably in the range of 60° C. to 150° C. in order to prevent transformation of the active material-containing layer 2 caused by heat.

In the compression-molded electrode sheet 10, the active material-supporting section 3a of the current collector 3 is stretched and thus is slack. As such, the roll-up tension (stress) at the guide roller 78 is hardly applied to the active material-supporting section 3a, and the roll-up tension is concentrated on the active material-non-supporting section 3b not stretched after the compression.

The electrode sheet 10 having passed through the guide roller 78 is rolled up by the roll-up unit 73 through the guide roller 76 and the guide roller 78. Further, the hoop-shaped electrode sheet 10 is cut into a desired size as necessary, thereby yielding an electrode. The electrode sheet 10 can also be used directly as an electrode.

In the example shown in the figures, the edge region of the current collector 3 along the third edge 3c and the relief surface 84a are arranged to face each other at the guide roller 78. Such an arrangement can alleviate the concentration of the stress on the third edge 3c, and thus is preferable. Specifically, large stress applied to the active material-non-supporting section 3b of the current collector 3 is not concentrated only on the vicinity of the third edge 3c in the stretching operation, so that the stress can be dispersed over the width of the active material-non-supporting section 3b in the short-side direction (Y-direction). Therefore, even if small cracks, etc., are formed on the end surface of the third edge 3c of the current collector 3, for example, cracking or breakage can be prevented by alleviating the concentration of stress. Namely, if the stress is concentrated on scratches or cracks on the end surface, for example, the scratches or cracks lead to cracking or breakage more easily. However, by preventing concentration of the stress on the third edge 3c spaced apart at a certain distance from the second edge 2b, while performing stretching by concentrating the stress on a portion of the active material-non-supporting section 3b near the second edge 2b of the active material-containing layer 2, which has particularly large strain, cracking or breakage can be suppressed while securing the stretching effect. In the preferred aspect, concentration of the stress can be prevented by the simple structure in which the guide roller 78 gradually decreases the diameter of the portion facing the vicinity of the third edge 3c of the current collector 3, to form the relief surface 84a retracted in a direction from the conveying plane 90 toward the center of the axis (or downward in FIG. 7).

The above aspect is an example of the press operation and stretching operation performed on the electrode sheet, and the method of producing the electrode according to the embodiment can be implemented with modification as appropriate. For example, the relief portion 84 and the relief surface 84a may be omitted without being provided to the guide roller 78.

Figure 9:
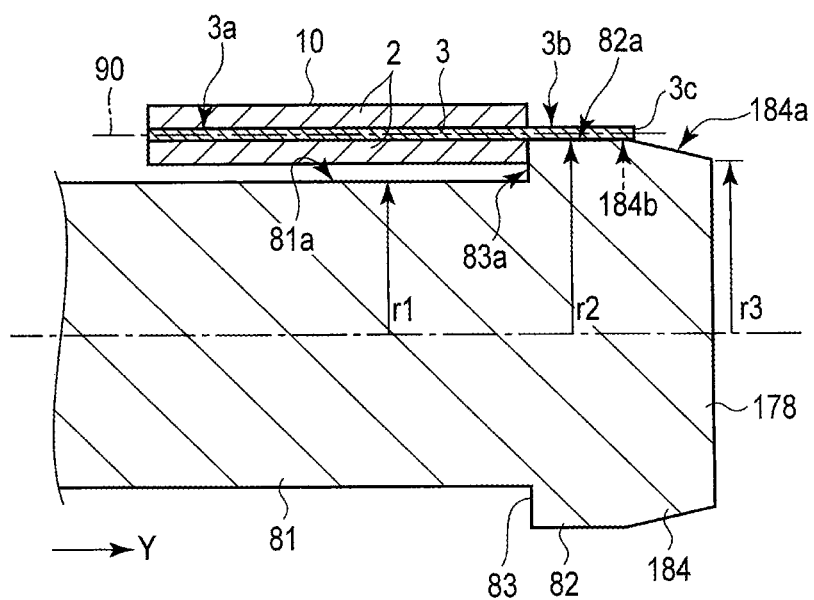
FIG. 9 is a cross-sectional view schematically showing a guide roller according to a modification.

Also, in the above example, the relief portion 84 of the guide roller 78 is formed continuous with the large-diameter portion 82 and rounded so that its diameter gradually decreases and its profile is curved; however, the relief portion is not limited thereto. For example, a guide roller 178 according to a modification shown in FIG. 9 includes a relief portion 184 in a section ahead of a start end 184b spaced apart from the step portion 83 in the axial direction; and the relief portion 184 is formed in a tapered shape so that its diameter decreases and its profile is inclined. The outer surface of the relief portion 184 forms a relief surface 184a. Even in such a case where the diameter is changed to render the cross-sectional shape linear, the concentration of the stress on the third edge 3c of the current collector 3 can be alleviated.

In the above example, the press unit 71 including the press rollers 71a and 71b is used. However, the press rollers can be replaced with some other structure that can densify the active material-containing layer 2. For example, a flat press can be used in place of the press rollers. Also, in the press operation, the pressure of press may be varied in a multi-stage manner.

In the above example, of the plural guide rollers, the single guide roller 78 is used as the stretching member. However, the number of guide rollers is not limited to the above example, and so are the number and positions of guide rollers used as the stretching member.

The outer peripheral surface of the large-diameter portion 82, which projects from the periphery to one of the ends of the guide roller 78 in the direction of its rotational axis, is formed as a projecting surface. However, the outer peripheral surface is not limited thereto and may be any surface that can provide the effect of stretching the active material-non-supporting section 3b. For example, the positions and numbers of step portions, large-diameter portions, and small-diameter portions can be changed as appropriate.

Further, the step portion 83 provided in the guide roller 78 is right-angled or substantially right-angled in the example shown in FIG. 6. However, the step portion is not limited thereto and may be tapered. In a guide roller 278 according to another modification shown in FIG. 10, for example, a corner of a step portion 283 has a curved surface. The smaller the radius of curvature of the corner portion, the greater the effect of stretching the active material-non-supporting section 3b of the current collector 3 can be. If the electrode sheet 10 meanders, however, the smaller radius causes a fracture of the electrode more easily. Therefore, the radius of curvature R (mm) of the corner portion is more preferably in the range of, for example, $0.5 \text{ mm} \leq R \leq 7 \text{ mm}$.

In the example shown in the figures, the active material-containing layer 2 is provided on both surfaces of the current collector 3; however, the active material-containing layer 2 may be provided only on one of the surfaces of the current collector 3.

A wound electrode group can be produced by, for example, stacking the electrode thus produced and a counter electrode on top of each other with a separator interposed therebetween and winding the resulting stack into a spiral form. For example, various procedures, such as housing the electrode group in a container member for a battery, introducing an electrolyte into the container member, as necessary, and sealing the container member, can be performed sequentially to thereby obtain a secondary battery.

<Method of Measuring Curving Amount>

The curving amount of the electrode can be measured as described below.

First, the position of the active material-non-supporting section of the current collector not provided with the active material-containing layer is determined in the electrode. For example, a section may be included where the active material-containing layer is not provided on either of the front and back principal surfaces and the current collector is exposed along one side of the flat electrode. As a more specific example, a section may be included where the current collector is exposed along one of the long sides of the flat electrode having a pair of arc-shaped long sides. In this case, the exposed portion of the current collector is determined as the active material-non-supporting section. Alternatively, for example, a section may be included where the current collector is exposed along both of the pair of long sides. In this case, one of the exposed portions of the current collector that has a larger short-side width is determined as an active material-non-supporting section capable of functioning as a current collecting tab, as in the above case.

An edge along the long side of the active material-non-supporting section is defined as the third edge. An edge of the active material-containing layer positioned at a boundary between the active material-non-supporting section and the active material-containing layer is defined as the second edge. An edge of the active material-containing layer positioned opposite from the third edge across the second edge in the electrode is defined as the first edge.

The points $P_1$ and $P_2$ are set on the first edge of the active material-containing layer. The points $P_1$ and $P_2$ are set so that the distance D of the straight line (reference line L) connecting these points is 1000 mm. The straight line connecting the points $P_1$ and $P_2$ is defined as a reference line L. A maximum distance M from the first edge to the reference line L is measured. When the direction from the first edge toward the second edge is defined as a positive value, the maximum distance M is determined as the curving amount.

The curving amount is measured in multiple portions along the first edge of the active material-containing layer, and a range of measurement values is obtained to perform evaluation of the curving amount. For example, five portions at an interval of 0.5 m per 2 m along the first edge can be determined as measurement portions. If the electrode has a band shape, the measurement is started from the portion at a distance of at least 0.5 m from the end of the band. However, the measurement is not limited thereto.

According to an embodiment, an electrode is provided. The electrode includes an active material-containing layer and a current collector. The active material-containing layer has a first edge having an arc shape and a second edge positioned opposite to the first edge, and includes an electrode active material. The current collector includes an active material-supporting section supporting the active material-containing layer, and an active material-non-supporting section which is adjacent to the active material-supporting section and the second edge and is not provided with the active material-containing layer. The curving amount is represented by a maximum distance from the first edge to a reference line connecting two points on the first edge, and the two points are spaced apart from each other at a straight-line distance of 1000 mm. When the curving amount in a direction from the first edge toward the second edge is represented by a positive value, the curving amount is in a range of −1 mm or more and less than 0 mm. An electrode group in which the electrode is used can be produced at a high yield.

EXAMPLES

Hereinafter, the embodiments will be described in more detail based on Examples. It should be noted, however, that the present invention is not limited to the Examples described below.

Example P1

A powder of lithium-nickel-cobalt-manganese composite oxide having a composition represented by the formula $LiNi_{0.8}Co_{0.1}Mn_{0.1}O_2$ was provided as an electrode active material.

The lithium-nickel-cobalt-manganese composite oxide powder, acetylene black as an electro-conductive agent, and polyvinylidene fluoride (PVdF) as a binder were added at a mixing ratio of 95 parts by weight:3 parts by weight:2 parts by weight into N-methylpyrrolidone (NMP) as a solvent, and mixed. Then, the resulting mixture was dispersed to prepare a slurry.

Next, the prepared slurry was applied onto a surface of a current collector made of an aluminum foil having a thickness of 15 μm. Then, the coating was dried. Likewise, the slurry was applied onto the back side of the aluminum foil, and the coating was dried. The aluminum foil was cut into a band shape which has a slurry coating of 100 mm and a slurry-unapplied portion having a width of 10 mm. Next, press and stretching operations were continuously performed on the obtained electrode sheet using an apparatus similar to the stretching apparatus shown in FIGS. 5 to 8. The stretching operation was performed at a tension of 25 N at the midpoint near the guide roller as a stretching member.

The press and stretching operations were continuously performed on the electrode sheet, to produce an electrode which includes an active material-containing layer having a mass of 160 g/m² per unit area for each surface of the current collector and a density of 3.3 g/cm³, and has a curving amount of −0.4 mm to −0.2 mm. Herein, the curving amount is represented by a range of numerical values obtained by measuring the maximum distance M from the first edge of the active material-containing layer to the reference line L in five respective portions at an interval of 0.5 m along the first edge when the straight-line distance D between the points $P_1$ and $P_2$ was set to 1000 mm by the above-described method.

Through the above procedure, the electrode was produced.

Examples P2 to P13, Comparative Examples P1 to P3

Electrodes were produced by the same procedure as that described in Example P1, except that the composition of the electrode active material, the mass of the active material-containing layer per unit area for each surface of the current collector, the density of the active material-containing layer, the slurry application width, the width of the unapplied portion, and the tension on the electrode sheet at the midpoint during the stretching operation were changed, as shown in Tables 1 and 2 below. The mass of the active material-containing layer per one surface of the current collector was adjusted by the coating amount of the slurry per one surface of the current collector. Table 2 also shows the curving amount measured for each electrode. The curving amount being "nearly zero" in Comparative Example P1 means that, in effect, no curve was identified because an absolute value of the curving amount was too small to perform accurate measurement.

TABLE 1

|  | Active Material Composition | Mass of Active Material-Containing Layer per Unit Area (g/m$^2$) | Density (g/m$^3$) | Slurry Application Width (mm) | Width of Unapplied Portion (mm) |
|---|---|---|---|---|---|
| Example P1 | LiNi$_{0.8}$Co$_{0.1}$Mn$_{0.1}$O$_2$ | 160 | 3.3 | 100 | 10 |
| Example P2 | LiNi$_{0.8}$Co$_{0.1}$Mn$_{0.1}$O$_2$ | 160 | 3.3 | 100 | 10 |
| Example P3 | LiNi$_{0.8}$Co$_{0.1}$Mn$_{0.1}$O$_2$ | 160 | 3.3 | 100 | 10 |
| Example P4 | LiNi$_{0.8}$Co$_{0.1}$Mn$_{0.1}$O$_2$ | 160 | 3.3 | 100 | 10 |
| Example P5 | LiNi$_{0.8}$Co$_{0.1}$Mn$_{0.1}$O$_2$ | 100 | 3.3 | 100 | 10 |
| Example P6 | LiNi$_{0.8}$Co$_{0.1}$Mn$_{0.1}$O$_2$ | 200 | 3.3 | 100 | 10 |
| Example P7 | LiNi$_{0.8}$Co$_{0.1}$Mn$_{0.1}$O$_2$ | 300 | 3.3 | 100 | 10 |
| Example P8 | LiNi$_{0.8}$Co$_{0.1}$Mn$_{0.1}$O$_2$ | 160 | 3.3 | 60 | 5 |
| Example P9 | LiNi$_{0.8}$Co$_{0.1}$Mn$_{0.1}$O$_2$ | 160 | 3.3 | 120 | 12 |
| Example P10 | LiNi$_{0.8}$Co$_{0.1}$Mn$_{0.1}$O$_2$ | 160 | 3.3 | 180 | 18 |
| Example P11 | LiNi$_{0.8}$Co$_{0.1}$Mn$_{0.1}$O$_2$ | 160 | 3.3 | 250 | 25 |
| Example P12 | LiMn$_2$O$_4$ | 160 | 2.9 | 100 | 10 |
| Example P13 | LiCoO$_2$ | 160 | 3.3 | 100 | 10 |
| Comparative Example P1 | LiNi$_{0.8}$Co$_{0.1}$Mn$_{0.1}$O$_2$ | 160 | 3.3 | 100 | 10 |
| Comparative Example P2 | LiNi$_{0.8}$Co$_{0.1}$Mn$_{0.1}$O$_2$ | 160 | 3.3 | 100 | 10 |
| Comparative Example P3 | LiNi$_{0.8}$Co$_{0.1}$Mn$_{0.1}$O$_2$ | 160 | 3.3 | 100 | 10 |

TABLE 2

|  | Tension at Midpoint (N) | Curving Amount (mm) |
|---|---|---|
| Example P1 | 25 | −0.4~−0.2 |
| Example P2 | 55 | −1.0~−0.8 |
| Example P3 | 40 | −0.7~−0.5 |
| Example P4 | 23 | −0.1~below 0 |
| Example P5 | 20 | −0.4~−0.2 |
| Example P6 | 40 | −0.4~−0.2 |
| Example P7 | 60 | −0.4~−0.2 |
| Example P8 | 13 | −0.4~−0.2 |
| Example P9 | 30 | −0.4~−0.2 |
| Example P10 | 45 | −0.4~−0.2 |
| Example P11 | 63 | −0.4~−0.2 |
| Example P12 | 25 | −0.4~−0.2 |
| Example P13 | 25 | −0.4~−0.2 |
| Comparative Example P1 | 20 | "Nearly Zero" |
| Comparative Example P2 | 15 | 0~1 |
| Comparative Example P3 | 10 | 1~3 |

Example N1

A niobium-titanium composite oxide having a composition represented by TiNb$_2$O$_7$ was provided as an electrode active material. Acetylene black (AB) as an electro-conductive agent, and carboxymethyl cellulose (CMC) and styrene-butadiene rubber (SBR) as binders were provided. The TiNb$_2$O$_7$, AB, CMC, and SBR were added at a mixing ratio of 95 parts by weight:2 parts by weight:1.5 parts by weight: 1.5 parts by weight into pure water as a solvent, and mixed. Then, the resulting mixture was dispersed to yield a slurry.

Then, the coating was dried. Likewise, the slurry was applied onto the back side of the aluminum foil, and the coating was dried. The aluminum foil was cut into a band shape which has a slurry coating of 100 mm and a slurry-unapplied portion having a width of 10 mm. Next, press and stretching operations were continuously performed on the obtained electrode sheet in the same manner as described in Example P1. The stretching operation was performed at a tension of 30 N at the midpoint near the guide roller as a stretching member.

The press and stretching operations were continuously performed on the electrode sheet, to produce an electrode which includes an active material-containing layer having a mass of 140 g/m$^2$ per unit area for each surface of the current collector and a density of 2.7 g/cm$^3$, and has a curving amount of −0.4 mm to −0.2 mm.

Through the above procedure, the electrode was produced.

Examples N2 to N11, Comparative Examples N1 to N3

Electrodes were produced by the same procedure as that described in Example N1, except that the composition of the electrode active material, the mass of the active material-containing layer per unit area for each surface of the current collector, the density of the active material-containing layer, the slurry application width, the width of the unapplied portion, and the tension at the roll-up point during the stretching operation were changed, as shown in Tables 3 and 4 below. The mass of the active material-containing layer per one surface of the current collector was adjusted by the coating amount of the slurry per one surface of the current collector. Table 4 also shows the curving amount measured for each electrode. The curving amount being "nearly zero" in Comparative Example N1 means that, in effect, no curve was identified, as in the case of Comparative Example P1.

Example N12

An electrode was produced by the same procedure as that described in Example N1, except that: a composite oxide having a composition represented by Li$_4$Ti$_5$O$_{12}$ was provided as an electrode active material; acetylene black (AB) as an electro-conductive agent, and polyvinylidene fluoride (PVdF) as a binder were provided; the Li$_4$Ti$_5$O$_{12}$, AB, and PVdF were added at a mixing ratio of 95 parts by weight:3 parts by weight:2 parts by weight into NMP as a solvent and mixed; and the density of the active material-containing layer, and the tension at the midpoint during the stretching operation were changed, as shown in Tables 3 and 4 below. The mass of the active material-containing layer per one surface of the current collector was adjusted by the coating amount of the slurry per one surface of the current collector.

TABLE 3

|  | Active Material Composition | Mass of Active Material-Containing Layer per Unit Area (g/m²) | Density (g/m³) | Slurry Application Width (mm) | Width of Unapplied Portion (mm) |
|---|---|---|---|---|---|
| Example N1 | TiNb₂O₇ | 140 | 2.7 | 100 | 10 |
| Example N2 | TiNb₂O₇ | 140 | 2.7 | 100 | 10 |
| Example N3 | TiNb₂O₇ | 140 | 2.7 | 100 | 10 |
| Example N4 | TiNb₂O₇ | 140 | 2.7 | 100 | 10 |
| Example N5 | TiNb₂O₇ | 100 | 2.7 | 100 | 10 |
| Example N6 | TiNb₂O₇ | 200 | 2.7 | 100 | 10 |
| Example N7 | TiNb₂O₇ | 200 | 2.7 | 100 | 10 |
| Example N8 | TiNb₂O₇ | 140 | 2.7 | 60 | 5 |
| Example N9 | TiNb₂O₇ | 140 | 2.7 | 120 | 12 |
| Example N10 | TiNb₂O₇ | 140 | 2.7 | 180 | 18 |
| Example N11 | TiNb₂O₇ | 140 | 2.7 | 250 | 25 |
| Example N12 | Li₄Ti₅O₁₂ | 140 | 2.1 | 100 | 10 |
| Comparative Example N1 | TiNb₂O₇ | 140 | 2.7 | 100 | 10 |
| Comparative Example N2 | TiNb₂O₇ | 140 | 2.7 | 100 | 10 |
| Comparative Example N3 | TiNb₂O₇ | 140 | 2.7 | 100 | 10 |

TABLE 4

|  | Tension at Midpoint (N) | Curving Amount (mm) |
|---|---|---|
| Example N1 | 30 | −0.4~−0.2 |
| Example N2 | 50 | −1.0~−0.8 |
| Example N3 | 40 | −0.7~−0.5 |
| Example N4 | 25 | −0.1~below 0 |
| Example N5 | 25 | −0.4~−0.2 |
| Example N6 | 50 | −0.4~−0.2 |
| Example N7 | 75 | −0.4~−0.2 |
| Example N8 | 18 | −0.4~−0.2 |
| Example N9 | 36 | −0.4~−0.2 |
| Example N10 | 42 | −0.4~−0.2 |
| Example N11 | 75 | −0.4~−0.2 |
| Example N12 | 25 | −0.4~−0.2 |
| Comparative Example N1 | 22 | "Nearly Zero" |
| Comparative Example N2 | 20 | 0~1 |
| Comparative Example N3 | 13 | 1~3 |

Example G1

The electrode produced in Example P1 was used as a positive electrode. The electrode produced in Example N1 was used as a negative electrode. The electrodes, which had been stored for a certain period after being produced, were used for both the positive electrode and the negative electrode. A separator made of a polyethylene porous film having a thickness of 15 μm was provided. Next, the positive electrode and the negative electrode were wound into a spiral form with the separator interposed therebetween, and then subjected to hot press, to thereby produce a flat electrode group. A total of 100 flat electrode groups were produced by the same procedure.

Examples G2 to G26, Comparative Examples G1 to G9

One hundred electrode groups were produced by the same procedure as that described in Example G1, except that the combination of the electrodes used were changed to those shown in Tables 5 to 7.

TABLE 5

|  | Positive Electrode | Curving Amount of Positive Electrode when Electrode was Produced (mm) | Negative Electrode | Curving Amount of Negative Electrode when Electrode was Produced (mm) | Frequency of Occurring of Winding Misalignment Defect (Number of Times among 100) |
|---|---|---|---|---|---|
| Example G1 | Example P1 | −0.4~−0.2 | Example N1 | −0.4~−0.2 | 1 |
| Example G2 | Example P2 | −1.0~−0.8 | Example N1 | −0.4~−0.2 | 4 |
| Example G3 | Example P3 | −0.7~−0.5 | Example N1 | −0.4~−0.2 | 3 |
| Example G4 | Example P4 | −0.1~below 0 | Example N1 | −0.4~−0.2 | 2 |
| Example G5 | Example P5 | −0.4~−0.2 | Example N1 | −0.4~−0.2 | 2 |
| Example G6 | Example P6 | −0.4~−0.2 | Example N1 | −0.4~−0.2 | 1 |
| Example G7 | Example P7 | −0.4~−0.2 | Example N1 | −0.4~−0.2 | 1 |
| Example G8 | Example P8 | −0.4~−0.2 | Example N1 | −0.4~−0.2 | 2 |
| Example G9 | Example P9 | −0.4~−0.2 | Example N1 | −0.4~−0.2 | 2 |
| Example G10 | Example P10 | −0.4~−0.2 | Example N1 | −0.4~−0.2 | 1 |
| Example G11 | Example P11 | −0.4~−0.2 | Example N1 | −0.4~−0.2 | 2 |

TABLE 5-continued

|  | Positive Electrode | Curving Amount of Positive Electrode when Electrode was Produced (mm) | Negative Electrode | Curving Amount of Negative Electrode when Electrode was Produced (mm) | Frequency of Occurring of Winding Misalignment Defect (Number of Times among 100) |
|---|---|---|---|---|---|
| Example G12 | Example P12 | −0.4~−0.2 | Example N1 | −0.4~−0.2 | 1 |
| Example G13 | Example P13 | −0.4~−0.2 | Example N1 | −0.4~−0.2 | 2 |
| Example G14 | Example P1 | −0.4~−0.2 | Comparative Example N1 | "Nearly Zero" | 4 |

TABLE 6

|  | Positive Electrode | Curving Amount of Positive Electrode when Electrode was Produced (mm) | Negative Electrode | Curving Amount of Negative Electrode when Electrode was Produced (mm) | Frequency of Occurring of Winding Misalignment Defect (Number of Times among 100) |
|---|---|---|---|---|---|
| Example G15 | Example P1 | −0.4~−0.2 | Example N2 | −1.0~−0.8 | 4 |
| Example G16 | Example P1 | −0.4~−0.2 | Example N3 | −0.7~−0.5 | 3 |
| Example G17 | Example P1 | −0.4~−0.2 | Example N4 | −0.1~below 0 | 3 |
| Example G18 | Example P1 | −0.4~−0.2 | Example N5 | −0.4~−0.2 | 2 |
| Example G19 | Example P1 | −0.4~−0.2 | Example N6 | −0.4~−0.2 | 3 |
| Example G20 | Example P1 | −0.4~−0.2 | Example N7 | −0.4~−0.2 | 1 |
| Example G21 | Example P1 | −0.4~−0.2 | Example N8 | −0.4~−0.2 | 2 |
| Example G22 | Example P1 | −0.4~−0.2 | Example N9 | −0.4~−0.2 | 1 |
| Example G23 | Example P1 | −0.4~−0.2 | Example N10 | −0.4~−0.2 | 2 |
| Example G24 | Example P1 | −0.4~−0.2 | Example N11 | −0.4~−0.2 | 2 |
| Example G25 | Example P1 | −0.4~−0.2 | Example N12 | −0.4~−0.2 | 1 |
| Example G26 | Comparative Example P1 | "Nearly Zero" | Example N1 | −0.4~−0.2 | 4 |

TABLE 7

|  | Positive Electrode | Curving Amount of Positive Electrode when Electrode was Produced (mm) | Negative Electrode | Curving Amount of Negative Electrode when Electrode was Produced (mm) | Frequency of Occurring of Winding Misalignment Defect (Number of Times among 100) |
|---|---|---|---|---|---|
| Comparative Example G1 | Comparative Example P1 | "Nearly Zero" | Comparative Example N1 | "Nearly Zero" | 9 |
| Comparative Example G2 | Comparative Example P1 | "Nearly Zero" | Comparative Example N2 | 0~1 | 10 |
| Comparative Example G3 | Comparative Example P1 | "Nearly Zero" | Comparative Example N3 | 1~3 | 15 |
| Comparative Example G4 | Comparative Example P2 | 0~1 | Comparative Example N1 | "Nearly Zero" | 10 |
| Comparative Example G5 | Comparative Example P2 | 0~1 | Comparative Example N2 | 0~1 | 13 |
| Comparative Example G6 | Comparative Example P2 | 0~1 | Comparative Example N3 | 1~3 | 15 |
| Comparative Example G7 | Comparative Example P3 | 1~3 | Comparative Example N1 | "Nearly Zero" | 11 |
| Comparative Example G8 | Comparative Example P3 | 1~3 | Comparative Example N2 | 0~1 | 15 |
| Comparative Example G9 | Comparative Example P3 | 1~3 | Comparative Example N3 | 1~3 | 18 |

<Evaluation>

Among the 100 electrode groups produced in each of Examples G1 to G26 and Comparative Examples G1 to G9, the number of electrode groups which had a "defect" due to winding misalignment occurring during winding of the stack including the positive electrode, negative electrode, and separator, was recorded. The results thereof are shown in Tables 5 to 7 above.

As demonstrated by the above results, the frequency of occurrence of a defect due to the winding misalignment was small in the electrode groups (Examples G1 to G26) produced in Examples G1 to G26, which adopted the electrodes of Examples P1 to P13 whose curving amount was adjusted in the range of −1 mm or more and less than 0 mm as positive electrodes, and/or the electrodes of Examples N1 to N12 whose curving amount was likewise adjusted as negative electrodes. In the electrode groups produced in Comparative Examples G1 to G9, which did not use the electrodes whose curving amount was adjusted in the above range as positive electrodes or negative electrodes, a defect due to the winding misalignment occurred at high frequency.

According to at least one embodiment and Example described above, an electrode is provided. The electrode includes an active material-containing layer and a current collector. The active material-containing layer has a first edge having an arc shape and a second edge positioned opposite to the first edge, and includes an electrode active material. The current collector includes an active material-supporting section supporting the active material-containing layer, and an active material-non-supporting section which is adjacent to the active material-supporting section and the second edge and is not provided with the active material-containing layer. The curving amount is represented by a maximum distance from the first edge to a reference line connecting two points on the first edge, and the two points are spaced apart from each other at a straight-line distance of 1000 mm. When the curving amount in a direction from the first edge toward the second edge is represented by a positive value, the curving amount is in a range of −1 mm or more and less than 0 mm.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode, comprising:
an active material-containing layer comprising a first edge having an arc shape and a second edge positioned opposite to the first edge, the active material-containing layer comprising an electrode active material; and
a current collector comprising an active material-supporting section supporting the active material-containing layer, and an active material-non-supporting section which is adjacent to the active material-supporting section and the second edge and is not provided with the active material-containing layer,
wherein
at least one surface of the current collector comprises the active material-supporting section and the active material-non-supporting section,
the active material-containing layer comprises a surface defined by the first edge and the second edge, the surface being supported by the active material-supporting section,
when
a curving amount in a plane of the active material-containing layer is represented by a maximum distance from the first edge to a reference line connecting two points on the first edge,
the two points are spaced apart from each other at a straight-line distance of 1000 mm, and
the curving amount in a direction from the first edge toward the second edge is represented by a positive value, and
the curving amount is in a range of −1 mm or more and less than 0 mm.

2. The electrode according to claim 1, wherein the current collector comprises aluminum.

3. The electrode according to claim 1, wherein a width of the active material-containing layer between the first edge and the second edge is from 60 mm to 250 mm, and a width of the active material-non-supporting section in a direction intersecting with the second edge is from 5 mm to 25 mm.

4. The electrode according to claim 1, wherein a mass per unit area of the active material-containing layer on the active material-supporting section is from 100 g/m$^2$ to 300 g/m$^2$ for each surface of the current collector.

5. The electrode according to claim 1, wherein the curving amount is in a range of −1 mm or more and −0.05 mm or less.

6. The electrode according to claim 1, wherein the curving amount is an amount of curve when producing the electrode.

7. The electrode according to claim 1, wherein the curving amount is determined before producing an electrode group comprising the electrode.

* * * * *